(12) United States Patent
Sim et al.

(10) Patent No.: US 8,095,071 B2
(45) Date of Patent: Jan. 10, 2012

(54) METHOD FOR PAIRING WIRELESS COMMUNICATION DEVICES AND APPARATUS FOR THE SAME

(75) Inventors: Sang Hyun Sim, Seoul (KR); Bo Il Seo, Gunpo-si (KR); Soon Jin Choi, Suwon-si (KR); Chung Hee Lee, Suwon-si (KR); Ji Hoon Kim, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 477 days.

(21) Appl. No.: 12/407,135

(22) Filed: Mar. 19, 2009

(65) Prior Publication Data

US 2010/0120365 A1 May 13, 2010

(30) Foreign Application Priority Data

Nov. 13, 2008 (KR) .................. 10-2008-0112530

(51) Int. Cl.
*H04B 7/00* (2006.01)
(52) U.S. Cl. .................. 455/41.2; 455/39
(58) Field of Classification Search .................. None
See application file for complete search history.

(56) References Cited

U.S. PATENT DOCUMENTS

| | | | |
|---|---|---|---|
| 7,953,400 B2 * | 5/2011 | Lee et al. | 455/418 |
| 2007/0184847 A1 * | 8/2007 | Hansen et al. | 455/456.1 |
| 2007/0249286 A1 * | 10/2007 | Ma et al. | 455/41.3 |
| 2009/0143012 A1 * | 6/2009 | Jeon | 455/41.2 |
| 2009/0286479 A1 * | 11/2009 | Thoresson et al. | 455/41.3 |

FOREIGN PATENT DOCUMENTS

| KR | 10-2006-0085711 A | 7/2006 |
|---|---|---|
| KR | 10-0693224 B1 | 3/2007 |

* cited by examiner

*Primary Examiner* — Tuan T Lam
(74) *Attorney, Agent, or Firm* — Lowe, Hauptman, Ham & Berner, LLP

(57) ABSTRACT

The present invention relates to a method for pairing wireless communication devices through a simple process by selecting a wireless communication device desired by a user by receiving beacons of the wireless communication devices connected to IEEE 802.15.4 wireless communication network and setting pairing with a wireless communication device corresponding to a beacon with the greatest LQI (Link Quality Index) among the received beacons by a pairing request device needing pairing, and an apparatus for the same. In accordance with the present invention, the method for pairing the wireless communication devices connected to the IEEE 802.15.4 communication network in order to transceive wireless data including: a) an initial setting step of trying pairing to have access to one of the wireless communication devices by the pairing request device; b) a search step of performing active scan to search the wireless data received in the pairing request device; c) an inquiry step of requesting the beacons to the wireless communication devices and receiving the beacons from the wireless communication devices; and d) a pairing step of selecting one of the beacons received in the pairing request device in order to request the wireless data to the corresponding wireless communication device.

7 Claims, 4 Drawing Sheets

[FIG. 1]
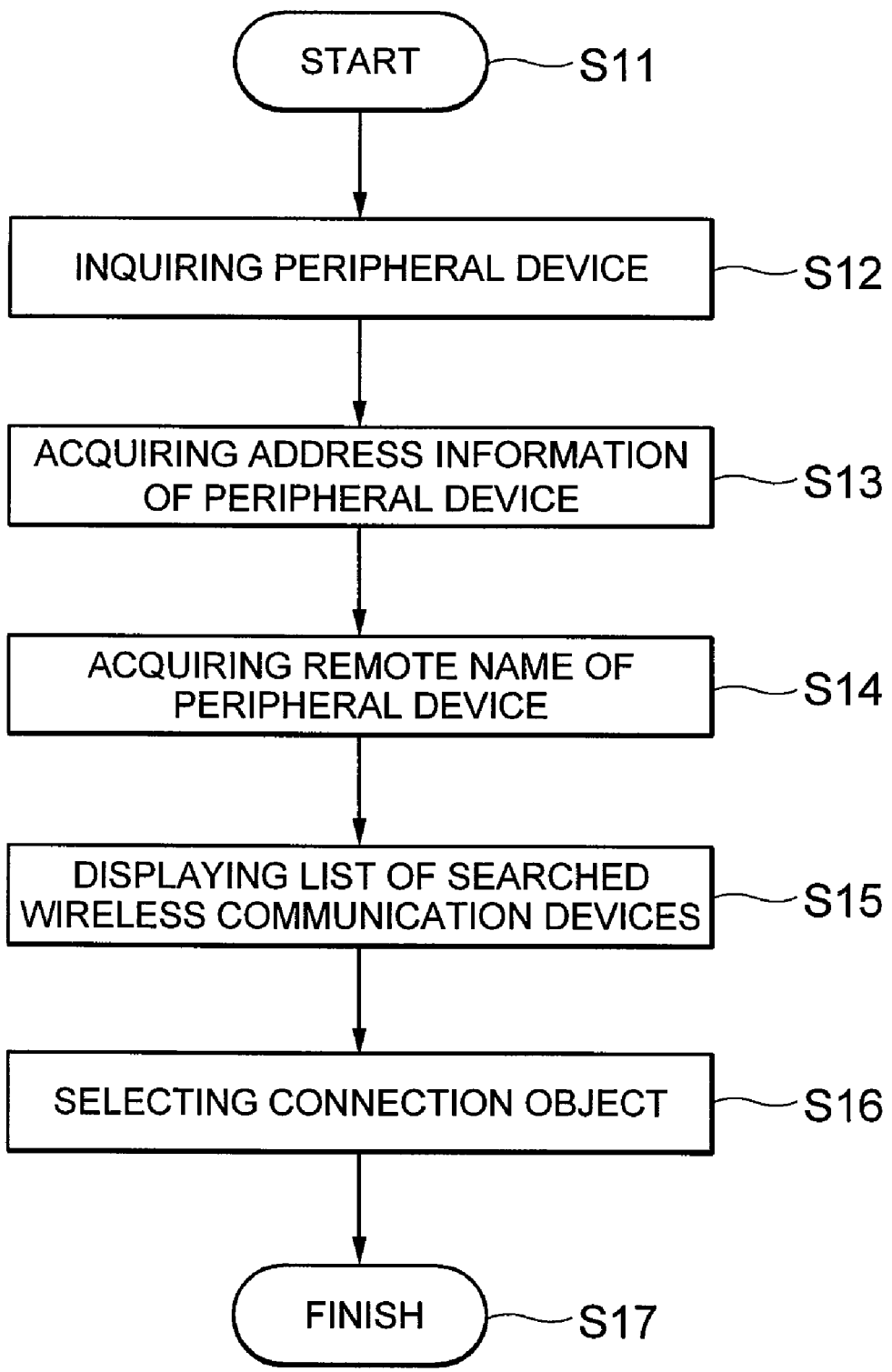
- PRIOR ART -

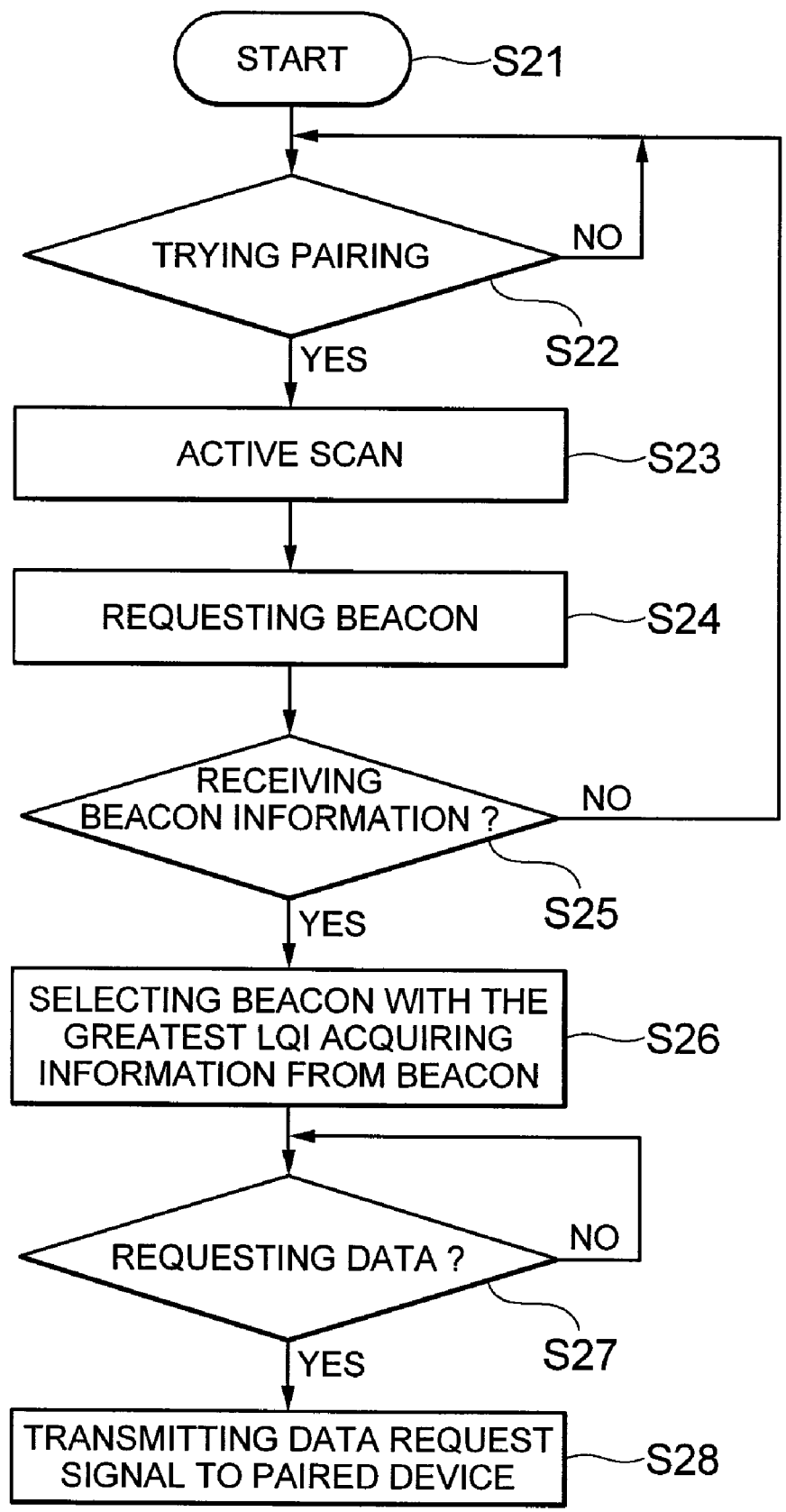
[FIG. 2]

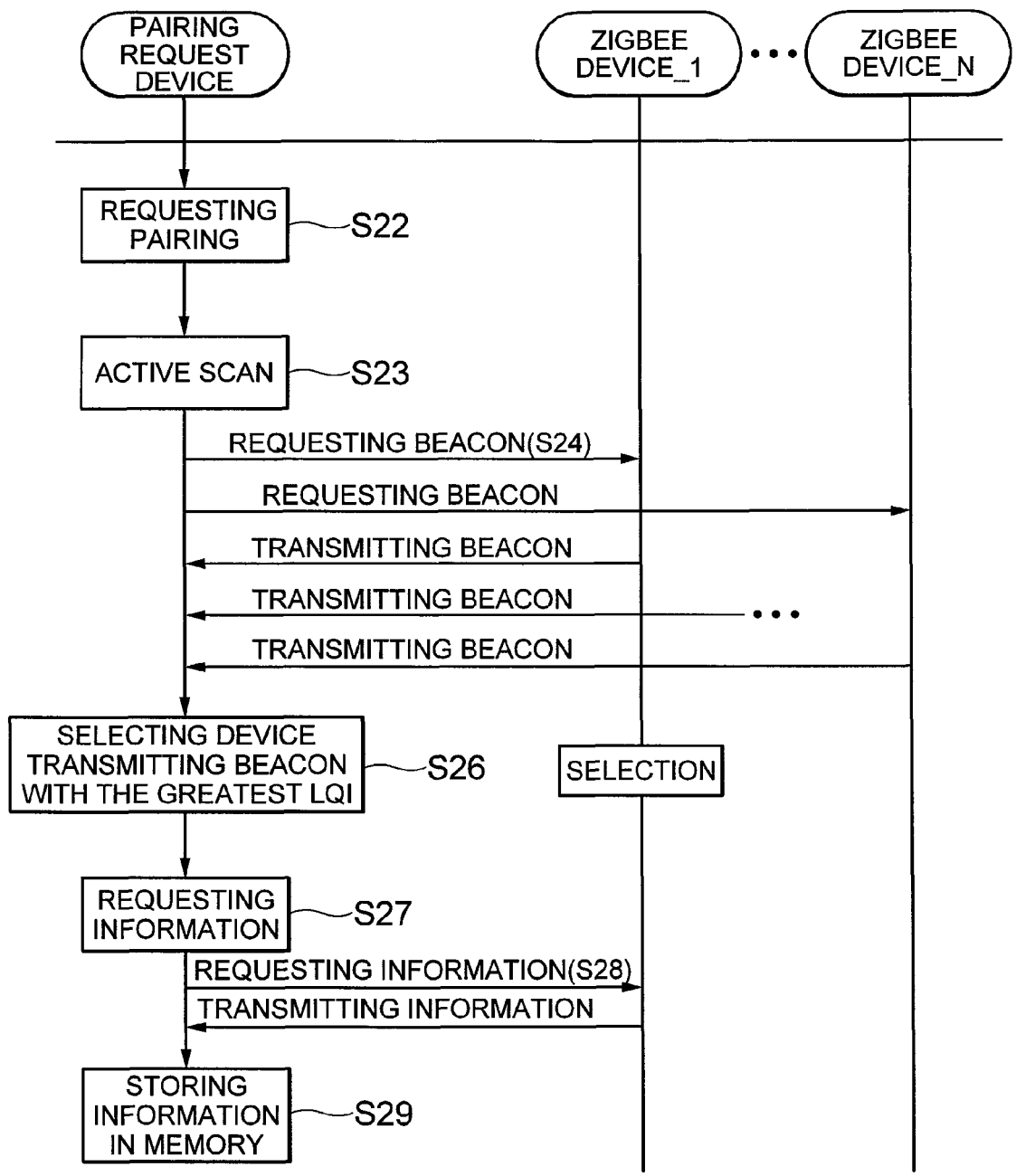
[FIG. 3]

[FIG. 4]
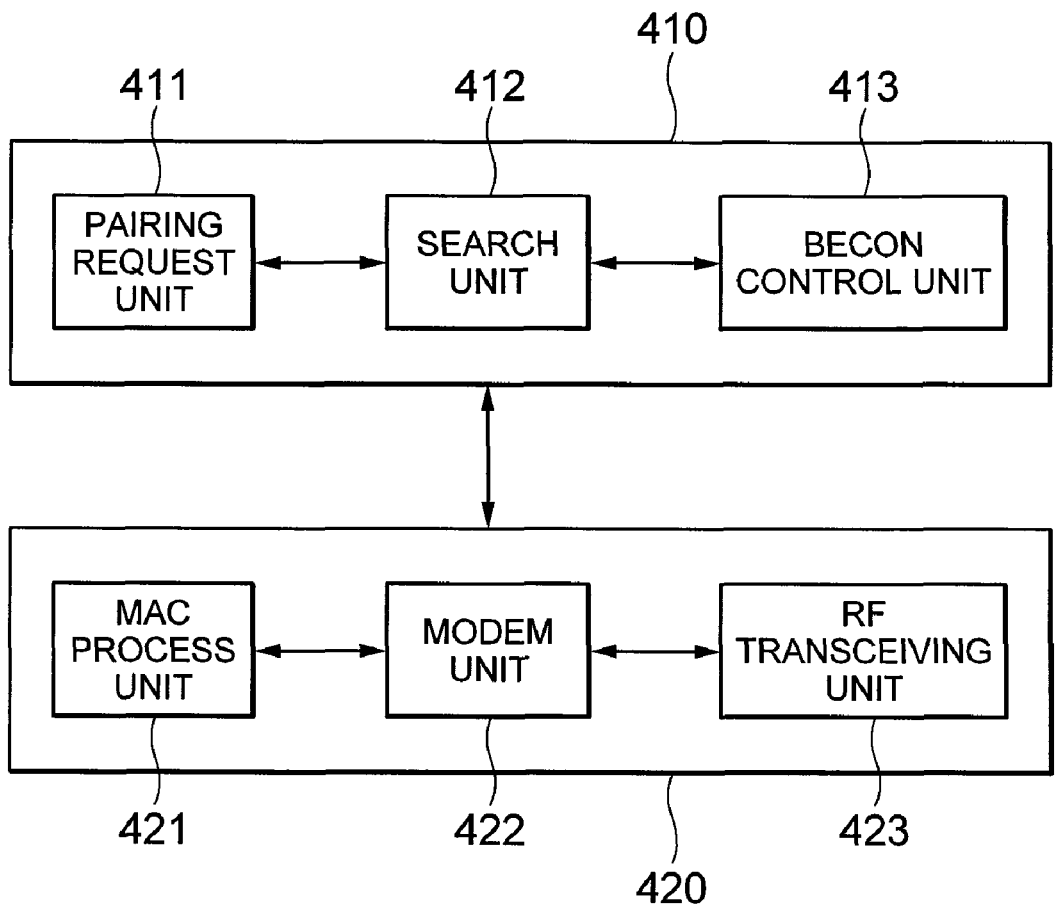
[FIG. 5]
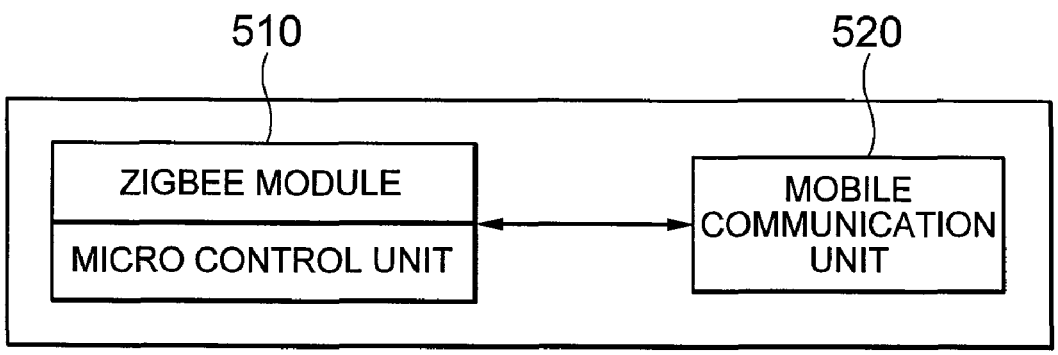

METHOD FOR PAIRING WIRELESS COMMUNICATION DEVICES AND APPARATUS FOR THE SAME

CROSS-REFERENCE TO RELATED APPLICATIONS

This application claims the benefit of Korean Patent Application No. 10-2008-0112530 filed with the Korea Intellectual Property Office on Nov. 13, 2008, the disclosure of which is incorporated herein by reference.

BACKGROUND OF THE INVENTION

1. Field of the Invention

The present invention relates to a method for pairing wireless communication devices and an apparatus for the same; and, more particularly, to a method for pairing wireless communication devices through a simple process by selecting a wireless communication device desired by a user by receiving beacons of the wireless communication devices connected to IEEE 802.15.4 wireless communication network and setting pairing with a wireless communication device corresponding to a beacon with the greatest LQI (Link Quality Index) among the received beacons by a pairing request device needing pairing, and an apparatus for the same.

2. Description of the Related Art

Recently, as a technology using low-cost and low-power wireless device or wireless link is arousing much interest in development of a technology field related to wireless communication, a variety of technologies related to the wireless communication have been developed and implemented.

Unlike wire communication, as the use of the wireless communication is increasing, a case occurs to use a new wireless communication device after connecting it to communication network. In addition, a case occurs where the new wireless communication device temporarily needs connection. In this case, connection between wireless devices is tried through pairing.

Since as a representative example of near field communication, Bluetooth, which is a wireless communication type based on a near-field radio technology, operates in an ISM (Industrial, Scientific, Medical) frequency band of approximately 2.4 GHz and transmits voice and data from a distance of a 10 m radius at the maximum speed of 1 Mbps, and power consumption of a Bluetooth module is very low, the Bluetooth is a technology of which application is expected to increase rapidly in the future.

Hereinafter, a connection process between conventional Bluetooth mobile communication terminals will be described with reference to FIG. 1. An inquiry packet is broadcasted in order to search peripheral Bluetooth devices by a mobile communication terminal needing Bluetooth-connection to another mobile communication terminal at step S12, wherein the peripheral Bluetooth device receiving the inquiry packet transmits an FHS (Frequency Hopping Selection) packet in response to this. The FHS packet includes three parts of an access code, a header and a payload, wherein total 48 bits of an LAP (Lower Address Part, 24 bits), a UAP (Upper Address Part, 8 bits) and an NAP (Non-Significant Address Part, 16 bits) of the payload determine addresses of Bluetooth devices as eigenvalues assigned to all the Bluetooth devices. Therefore, address information of the Bluetooth device can be acquired from the payload of the transmitted packet at step S13.

Thereafter, after collecting remote names of the Bluetooth devices through remote name request for the peripheral Bluetooth devices searched through the inquiry at step S14, if the searched address information and remote names of the Bluetooth devices are displayed on a user's mobile communication terminal at step S15, a user selects the desired mobile communication terminal needing connection from a list at step S16 and transmits a paging packet and the corresponding mobile communication terminal transmits a paging response packet in order to implement pairing between the two Bluetooth mobile communication terminals at step S17.

However, since the address information of the Bluetooth devices consists of HEX codes, it is difficult for the user to distinguish the codes and although the remote names of the Bluetooth devices are collected through the remote name request, since the names of the Bluetooth devices can be changed in default values according to user's selection, if several Bluetooth devices are searched through the above steps, it is difficult for the user to perform a pairing step by selecting the desired mobile communication terminal. And even though the communication terminal needing the connection can be selected from the searched Bluetooth devices, for this, the user should wait for a long time after selecting the search in order to set up the connection, which causes inconvenience to the user.

Accordingly, a need is increasing to provide a method for pairing wireless communication devices and an apparatus for the same capable of pairing the wireless communication devices needing the pairing by the wireless communication device through a simple operational command and reducing search and selection times required for this without distinguishing addresses of the wireless communication devices by the user.

Further, it is difficult to apply the Bluetooth pairing method to other wireless communication using the same band of 2.4 GHz in the same manner and also in the method for pairing the IEEE 802.15.4 wireless communication devices such as a ZigBee of which an application is increasing recently, a need is increasing to solve the problem of the Bluetooth pairing method and provide a unique pairing method of the wireless communication

SUMMARY OF THE INVENTION

The present invention has been proposed in order to overcome the above-described problems and it is, therefore, an object of the present invention to provide a method for pairing wireless communication devices through a simple process by selecting a wireless communication device desired by a user by receiving beacons of the wireless communication devices connected to IEEE 802.15.4 wireless communication network and setting pairing with a wireless communication device corresponding to a beacon with the greatest LQI (Link Quality Index) among the received beacons by a pairing request device needing pairing, and an apparatus for the same.

In accordance with one aspect of the present invention to achieve the object, there is provided a method for pairing wireless communication devices connected to IEEE 802.15.4 communication network in order to transceive wireless data, the method including: a) an initial setting step of trying pairing to have access to one of the wireless communication devices by a pairing request device; b) a search step of performing active scan to search the wireless data received in the pairing request device; c) an inquiry step of requesting beacons to the wireless communication devices and receiving the beacons from the wireless communication devices; and d) a pairing step of selecting one of the beacons received in the pairing request device in order to request the wireless data to the corresponding wireless communication device.

Further, it is preferable that a beacon with the greatest LQI (Link Quality Index) among the received beacons is selected in the step d).

Further, it is preferable that the pairing request device sets the pairing with a plurality of wireless communication devices among the wireless communication devices by repeating the steps a) to d).

Meanwhile, in accordance with another aspect of the present invention to achieve the object, there is provided a pairing request device paired with wireless communication devices connected to IEEE 802.15.4 wireless communication network in order to transceive wireless data, the pairing request device including: a pairing request unit for trying pairing to have access to one of the wireless communication devices; a search unit for performing active scan to search the received wireless data if the pairing request unit is activated; and a beacon control unit for requesting beacons to the wireless communication devices and receiving the beacons from the wireless communication devices, wherein the beacon control unit selects one of the received beacons in order to request the wireless data to the corresponding wireless communication device.

Further, it is preferable that the beacon control unit selects a beacon with the greatest LQI (Link Quality Index) among the received beacons.

Meanwhile, in accordance with still another aspect of the present invention to achieve the object, there is provided a mobile communication terminal including an IEEE 802.15.4 wireless module and performing communication through mobile communication network, wherein for pairing with other IEEE 802.15.4 wireless communication devices, the IEEE 802.15.4 wireless module includes a micro control unit for receiving beacons and the micro control unit requests the beacons to the other IEEE 802.15.4 wireless communication devices, receive the beacons from the other IEEE 802.15.4 wireless communication devices, and selects one of the received beacons in order to request wireless data to the corresponding IEEE 802.15.4 wireless communication device.

Further, it is preferable that the micro control unit selects a beacon with the greatest LQI among the received beacons.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a flow chart showing a connection process between wireless communication devices in accordance with the prior art;

FIG. 2 is a flow chart circuit sequentially illustrating a process for pairing wireless communication devices in accordance with one embodiment of the present invention;

FIG. 3 is a flow chart illustrating a method for pairing the wireless communication devices in accordance with one embodiment of the present invention;

FIG. 4 is a block diagram illustrating a pairing request device in accordance with one embodiment of the present invention; and FIG. 5 is a block diagram illustrating a mobile communication terminal in accordance with one embodiment of the present invention.

DETAILED DESCRIPTION OF THE PREFERABLE EMBODIMENTS

A matter regarding to an operation effect including a technical configuration for an object of a method for pairing wireless communication devices and an apparatus for the same in accordance with the present invention will be appreciated clearly through the following detailed description with reference to the accompanying drawings illustrating preferable embodiments of the present invention.

A method for pairing wireless communication devices and an apparatus for the same in accordance with the present invention relate to an IEEE 802.15.4 wireless communication; and, more particularly, to a ZigBee communication protocol referring to the time when rising to a network layer and an application layer as well as a simple wireless communication device using only an IEEE 802.15.4 MAC layer.

Therefore, it will be apparent to those skilled in the art that "Zigbee" used in one embodiment of the present invention and FIG. 2 to FIG. 5 can be applied to the entire IEEE 802.15.4 wireless communication without limiting to or defining only the "Zigbee".

FIG. 2 is a flow chart circuit sequentially illustrating a process for pairing wireless communication devices in accordance with one embodiment of the present invention and FIG. 3 is a flow chart illustrating a method for pairing the wireless communication devices in accordance with one embodiment of the present invention.

In accordance with the one embodiment of the present invention, the method for pairing the wireless communication devices connected to a wireless communication network in order to transceive wireless data includes the steps of: an initial setting step; a wireless communication device search step; a beacon inquiry step; and a pairing step.

At first, a pairing request device tries pairing to have access to one of the wireless communication devices at step S22. If a user selects a pairing button, e.g., a key pad or a functional unit implemented on a touch screen provided in the pairing request device, the pairing request device recognizes that the pairing is tried and performs a subsequent step.

Thereafter, the pairing request device performs active scan in order to search received wireless data at step S23.

The pairing request device requests beacons to the wireless communication devices connected to the wireless communication network at step S24 and inquires whether there are the beacons received from the wireless communication devices or not at step S25.

In general, the IEEE 802.15.4 wireless communication defines a MAC layer and a physical layer of a WPAN (Wireless Personal Area Network) focused on low power and low cost and defines a beacon mode in order to implement the lower power. For synchronization with the beacon, a router, a coordinator and a child device can define an active section and a non-active section. The router and the child device of the coordinator can implement lower power of a system by minimizing power of a transceiver and other peripheral devices in the thus-defined non-active section.

The pairing request device receiving the beacons selects a wireless communication device which transmits a beacon with the greatest LQI (Link Quality Index) representing link quality of a received packet and acquires information of the corresponding wireless communication device from the beacon at step S26.

Generally, a physical layer of the wireless communication device displays the link quality of the received packet, which is referred to as LQI. If the beacon with the greatest LQI is selected, a wireless communication device nearest to the pairing request device may be selected.

In other words, the user can simply set up pairing between the desired wireless communication device and the pairing request device by being positioned nearest to the wireless communication device of which the pairing is to be set up and selecting a pairing setting button of the pairing request device.

The method for pairing the wireless communication devices by using the LQI of the received beacons need not distinguish unique address information of the wireless communication device by the user and can easily select the wireless device with the greatest LQI even when receiving the beacons from a plurality of wireless communication devices, thereby facilitating pairing with the desired wireless communication device.

Thereafter, if the pairing request device needs data of the paired wireless communication device (Zigbee device_1 shown in FIG. 3) at step S27, it transmits a data request signal to the wireless communication device (Zigbee device_1 shown in FIG. 3) of which the data is requested at step S28. A subsequent process for transceiving the data is omitted.

Meanwhile, after setting the pairing with one wireless communication device by using the pairing request device, the user moves to a location where another wireless communication device is positioned and repeats the steps S22 to S26 such that the user can be paired with the another wireless communication device.

Therefore, in accordance with the one preferable embodiment of the present invention, if the pairing request device is a wireless universal remote controller, it is individually paired with a plurality of electronic devices connected to the wireless communication network and thereafter, it can receive control information from each of the electronic devices.

Further, in accordance with the one preferable embodiment of the present invention, if the pairing request device is a mobile communication terminal, it is paired with another mobile communication terminal including a wireless module and thereafter, it can receive data such as a phone number, a name card, a photograph file and a moving image file which are stored in the another mobile communication terminal.

Meanwhile, FIG. 4 is a block diagram illustrating the pairing request device in accordance with one embodiment of the present invention. As shown in FIG. 4, the present invention discloses the pairing request device paired with the IEEE 802.15.4 wireless communication devices which are connected to the wireless communication network in order to transceive the wireless data.

The pairing request device 400 includes a pairing module 410 and a wireless module 420. Further, the pairing module 410 includes a pairing request unit 411, a search unit 412, and a beacon control unit 413 and the wireless module 420 includes a MAC process unit 421, a modem unit 422, and an RF transceiving unit 423.

The wireless module 420 includes the RF transceiving unit 423 for receiving an RF signal of approximately 2.4 GHz, the modem unit 422 for demodulating the received signal from the RF transceiving unit 423, and the MAC process unit 421 for checking success of reception, validity of received data, and an error based on the demodulated signal from the modem unit 422. The physical layer specified in an IEEE 802.15.4 standard is implemented through the modem unit 422 of the IEEE 802.15.4 standard and the RF transceiving unit 423 of the IEEE 802.15.4 standard.

The pairing request unit 411 is selected by the user to try pairing such that the user has access to one of the wireless communication devices. For instance, it may be the keypad as a physical component. If the user requests the pairing by selecting the pairing request unit 411, e.g., the keypad, information for this is transmitted to the search unit 412.

If the search unit 412 receives the pairing request from the paring request unit 411, it performs active scan in order to search the received wireless data.

The beacon control unit 413 requests the beacons to the wireless communication devices which are connected to the wireless communication network and receives the beacons from the wireless communication devices. The beacon control unit 413 selects one of the received beacons and requests the wireless data to the corresponding wireless communication device. At this time, the beacon control unit 413 selects the beacon with the greatest LQI among the received beacons. The LQI is supplied by the modem unit 422 and the RF transceiving unit 423 as the physical layer.

Therefore, the user can be paired with the wireless communication device which is physically positioned nearest to the pairing request device 400.

Meanwhile, FIG. 5 is a block diagram illustrating a mobile communication terminal in accordance with one embodiment of the present invention. As shown in FIG. 5, the present invention discloses the mobile communication terminal including a wireless module and performing communication through a mobile communication network.

The mobile communication terminal 500 in accordance with the present invention includes a mobile communication unit 520 and the wireless module for pairing through IEEE 802.15.4 wireless communication, e.g., a Zigbee module 510. For pairing with other wireless communication devices, the Zigbee module 510 includes a micro control unit for receiving beacons.

The micro control unit requests the beacons to the wireless communication devices, receives the beacons from the wireless communication devices, and selects one of the received beacons in order to request wireless data to the corresponding wireless communication device. The micro control unit selects a beacon with the greatest LQI among the received beacons.

The wireless module can include the same components as those of the wireless communication device 400 as shown in FIG. 4 in order to receive data stored in another mobile communication terminal by being paired with the another mobile communication terminal by using the mobile communication network.

In accordance with the present invention, a pairing method using the mobile radio communication network of the mobile communication terminal 500 and the wireless module 510 for the same can obtain the same and/or similar components, operation, and effect as and/or to those of the method for pairing the wireless communication devices and the apparatus for the same (see FIG. 2 to FIG. 4).

As described above, the present invention provides the method for pairing the wireless communication devices through the simple process by selecting the wireless communication device desired by the user by receiving the beacons of the wireless communication devices connected to the IEEE 802.15.4 wireless communication network and setting the pairing with the wireless communication device corresponding to the beacon with the greatest LQI among the received beacons by the pairing request device needing the pairing between the wireless communication devices.

Further, the present invention can conveniently perform connection configuration at an application level without unnecessary intervention of the user by selectively connecting the desired wireless communication devices and performing the pairing step by the user.

As described above, although the preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:

1. A method for pairing wireless communication devices connected to IEEE 802.15.4 communication network in order to transceive wireless data, the method comprising:
   a) an initial setting step of trying pairing to have access to one of the wireless communication devices by a pairing request device;
   b) a search step of performing active scan to search the wireless data received in the pairing request device;
   c) an inquiry step of requesting beacons to the wireless communication devices and receiving the beacons from the wireless communication devices; and
   d) a pairing step of selecting one of the beacons received in the pairing request device in order to request the wireless data to the corresponding wireless communication device.

2. The method of claim 1, wherein a beacon with the greatest LQI (Link Quality Index) among the received beacons is selected in the step d).

3. The method of claim 2, wherein the pairing request device sets the pairing with a plurality of wireless communication devices among the wireless communication devices by repeating the steps a) to d).

4. A pairing request device paired with wireless communication devices connected to IEEE 802.15.4 wireless communication network in order to transceive wireless data, the pairing request device comprising:
   a pairing request unit for trying pairing to have access to one of the wireless communication devices;
   a search unit for performing active scan to search the received wireless data if the pairing request unit is activated; and
   a beacon control unit for requesting beacons to the wireless communication devices and receiving the beacons from the wireless communication devices,
   wherein the beacon control unit selects one of the received beacons in order to request the wireless data to the corresponding wireless communication device.

5. The pairing request device of claim 4, wherein the beacon control unit selects a beacon with the greatest LQI (Link Quality Index) among the received beacons.

6. A mobile communication terminal comprising an IEEE 802.15.4 wireless module and performing communication through mobile communication network,
   wherein for pairing with other IEEE 802.15.4 wireless communication devices, the IEEE 802.15.4 wireless module includes a micro control unit for receiving beacons, and
   the micro control unit requests the beacons to the other IEEE 802.15.4 wireless communication devices, receive the beacons from the other IEEE 802.15.4 wireless communication devices, and selects one of the received beacons in order to request wireless data to the corresponding IEEE 802.15.4 wireless communication device.

7. The mobile communication terminal of claim 6, wherein the micro control unit selects a beacon with the greatest LQI among the received beacons.

* * * * *